United States Patent [19]
Gullino et al.

[11] 3,897,751
[45] Aug. 5, 1975

[54] CAGE FOR CONTINUOUS INFUSION

[75] Inventors: Pietro M. Gullino, Bethesda, Md.; Flora H. Grantham, Washington, D.C.; Donald M. Hill, Frederick; Jesse Rowland, Bethesda, both of Md.

[73] Assignee: The United States of America as represented by the Assistant Secretary of the Department of Health, Education and Welfare, Washington, D.C.

[22] Filed: July 10, 1974

[21] Appl. No.: 487,032

[52] U.S. Cl. .................................. 119/15; 119/18
[51] Int. Cl. .......................................... A01k 29/00
[58] Field of Search .................. 119/1, 15, 17, 18; 128/1 R

[56] References Cited
UNITED STATES PATENTS

| 3,367,308 | 2/1968 | Quattrone et al. | 119/15 |
| 3,464,388 | 9/1969 | Stout | 119/15 |
| 3,494,329 | 2/1970 | Frieberger et al. | 119/1 |
| 3,540,413 | 11/1970 | Castaighe | 119/1 |

Primary Examiner—Hugh R. Chamblee

[57] ABSTRACT

An animal cage for use in a laboratory or other similar environment is disclosed. The cage includes a spring and catheter arrangement which allows the animal to have freedom of movement within the cage, while providing for continuous infusion of drugs or radioactive materials. Such infusion may be either the aortic or venous type.

7 Claims, 8 Drawing Figures

PATENTED AUG 5 1975 3,897,751

SHEET 1

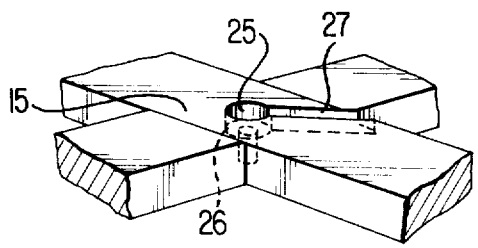
FIG. 3
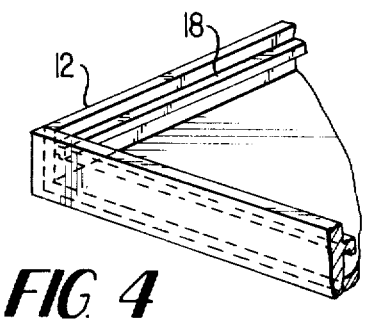
FIG. 4
FIG. 5
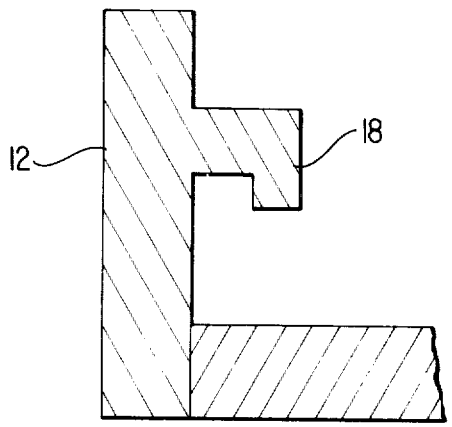
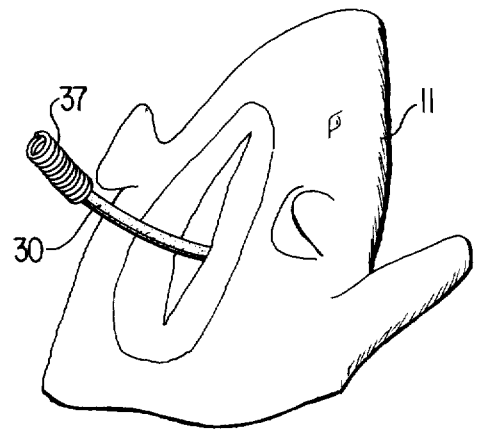
FIG. 6
FIG. 7
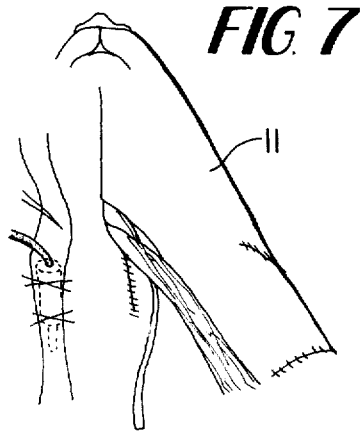
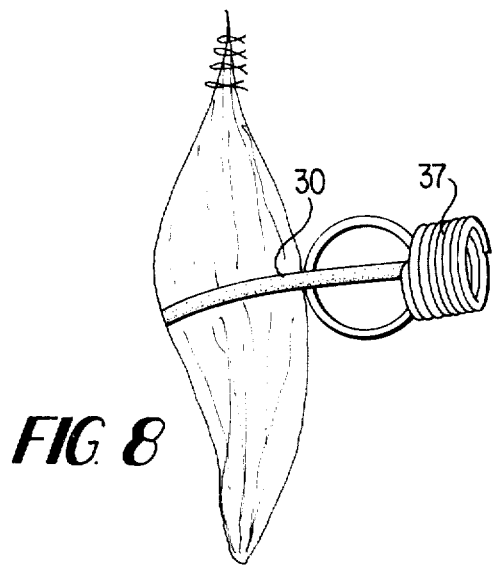
FIG. 8

CAGE FOR CONTINUOUS INFUSION

BACKGROUND AND SUMMARY OF THE INVENTION

The present invention is concerned with an animal cage for use in a laboratory or medical environment, in which the animal occupying the cage is free to move about and able to live for days while receiving continuous infusion of drugs or radioactive compounds. Important features of the animal cage of the present invention include freedom of movement for the animal, safety for laboratory personnel based on avoidance of leakage of infusate and/or excrements, and simplicity of operation.

Presently available animal cages for use in a laboratory environment are generally either restraining-type cages or those equipped for swivel-dependent infusion systems. The restraining cage is not usable for long-term infusion because the animal is constricted, cannot feed properly, and is under continuous stress which may alter its physiological response and thus the results of the experiment. Previously known swivel systems cannot operate under a positive pressure of 100 mm Hg or more, as required by aortic infusion. Even when venous infusion is used and hypertension is not a limiting factor, malfunction of swivels is a frequent occurrence, and usually caused by blood coagulation. Consequently, loss of infusate occurs and the experiment is ruined. Moreover, when radioisotopes are used, any leakage of infusate, urine or feces creates a laboratory hazard.

Continuous infusion of radioactive compounds or drugs into animals is a necessary procedure in many laboratories. To be successful, such a procedure requires a cage which provides freedom of movement for the animal, while being easy to decontaminate and having means to prevent loss of infusate. These features are essential characteristics of a cage developed in accordance with the present invention.

By the present invention, there is provided an animal cage for use in a laboratory environment, in which the animal occupying the cage may be comfortably maintained for a period of days or even weeks while receiving continuous infusion of drugs, radioactive compounds or other types of infusate. The animal cage of the present invention is constructed so that either aortic or venous infusion may be employed. In addition, leakage of urine or feces from within the cage is successfully avoided.

BRIEF DESCRIPTION OF THE DRAWINGS

The features of the animal cage construction of the present invention will be more fully understood from the following description of the preferred embodiments, taken in conjunction with the accompanying drawings, wherein:

FIG. 3 is a perspective view of a portion of the cross-shaped frame at the upper end of the animal cage of FIG. 1;

FIG. 4 is a perspective view of a portion of the base of the animal cage of FIG. 1;

FIG. 5 is a side elevation of a portion of the base shown in FIG. 4; and

FIGS. 6, 7 and 8 are perspective views showing the arrangement of animal and catheter in accordance with the principles of the present invention.

DESCRIPTION OF THE PREFERRED EMBODIMENTS

Figure 1:
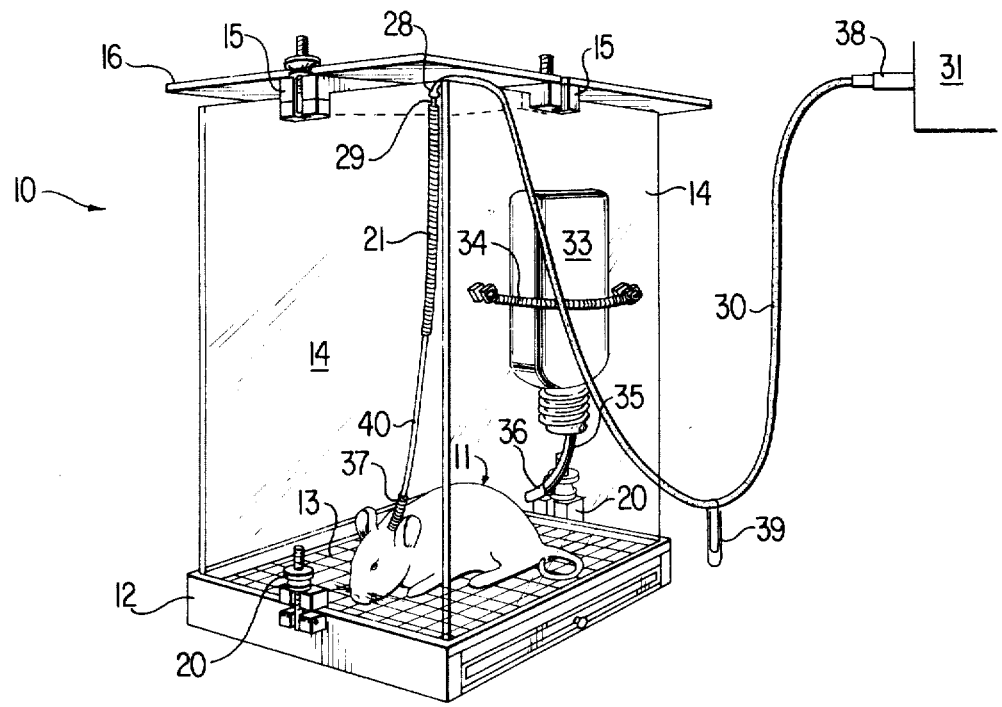
FIG. 1 is a perspective view of the animal cage of the present invention.
Figure 2:
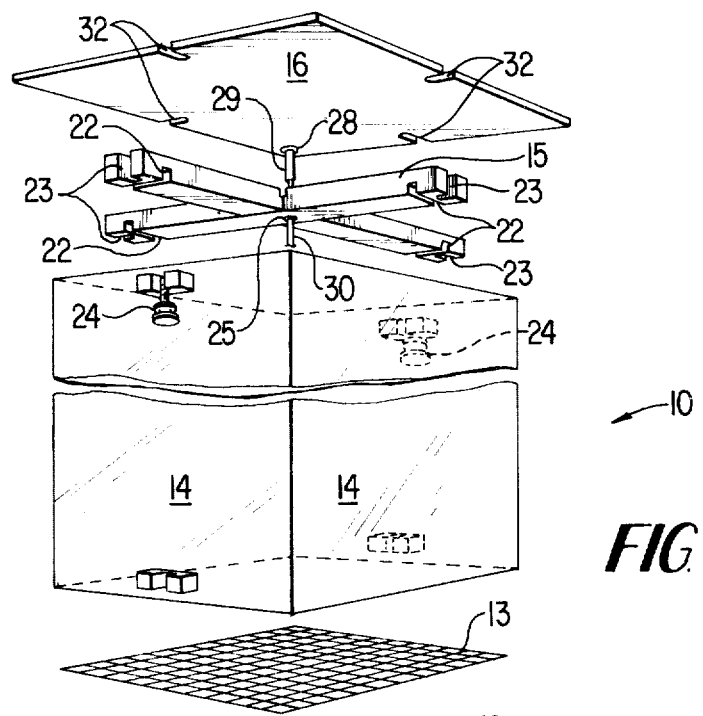
FIG. 2 is an exploded perspective view of various components of the animal cage shown in FIG. 1.
Figure 2:
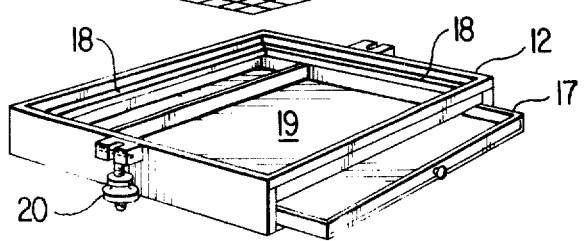

In the embodiment of the present invention as shown in FIGS. 1 through 5, a cage 10 is provided for use with a rat 11 or any animal in a weight range of 20 to about 700 g in a laboratory, the cage 10 being approximately 45 cm in height when assembled, as shown in FIG. 1, and including a base 12, a wire mesh screen 13 which covers the upper surface of the base 12, four rectangular walls 14 joined along their longer edges, a cross-shaped upper frame 15 and a cover 16. The material of construction for the major components, including the base 12, walls 14, frame 15 and cover 16 is preferably plexiglass. The base 12, which is preferably square in shape, having dimensions such as 26.5 × 26.5 × 7.0 cm and of 6 mm plexiglass, for example, contains a drawer 17 in the lower section and provides an enclosure around the periphery of a wire mesh screen 13 in the upper section of the base 12. The screen 13 may be of stainless steel wire cloth, 1.6 mm wire diameter and 12.8 mm mesh, for example, and rests on a rim formed by a 1 × 1 cm rod 18 which extends around the inner circumference of the base 12. The upper surface of the rod 18 is flat, while the lower surface is grooved, as shown in FIGS. 4 and 5. The drawer 17, having dimensions such as 25 × 25 × 2.5 cm and of 4 mm plexiglass, must fit snugly under the rim formed by the rod 18 so that the groove in the lower surface of the rod 18 will prevent urine from leaking beyond the drawer 17 by capillary action. The floor 19 of the drawer 17 where both feces and urine are collected can be covered by sawdust or an absorbant pad with plastic backing. The four walls 14, having dimensions such as 38 × 25 cm and of 4 mm plexiglass, are cemented together by a suitable adhesive such as ethylene dichloride to form a square container which fits within the base 12 and stands above the wire mesh screen 13. A pair of screw devices 20 firmly anchor the base 12, the wire mesh screen 13 and the four walls 14 together. The animal 11 stands on the wire mesh screen 13 but is free to move about since the animal 11 is only connected to the cage 10 by means of a spring 21 pivoting from the cross-shaped frame 15 in the ceiling of the cage 10.

Each arm of the cross-frame 15 may have dimensions such as 28 × 2.5 × 2.0 cm and is provided with a horizontal 22 and vertical 23 groove about 1 cm in depth. The horizontal groove 22 positions the cross 15 on each wall 14 while the vertical groove 23 accepts a screw device 24 which fastens the cross 15. At the confluence of the cross arms, a hole 25 is drilled, approximately 0.9 cm in diameter in the upper part, but having only a 0.4 cm diameter in the lower part so that a rim 26 is formed, as shown in FIG. 3. A groove 27, having dimensions such as 0.5 × 0.5 cm, connects the upper part of the 0.9 cm portion of the hole 25 with the intersection of two of the arms of the cross 15. An extension spring 21, formed of 0.4 mm wire × 0.25 cm OD, hangs through the hole 25 and is held in place by a ring 28 which fits loosely into the hole 25 and rests on the rim 26.

Rather than soldering the spring 21 directly to the ring 28, it is advantageous to solder the spring 21 to a short length of metal tubing 29 which bears the ring 28. This arrangement is critical to assure freedom of movement for the animal 11 and absence of leaks during the infusion process. Movement is possible because the spring 21 to which the animal 11 is attached can rotate freely. There is no movable joint in the path of fluid flow where potential leakage may occur. The catheter 30 provides an uninterrupted pathway from the infusion pump 31 into the vascular system of the animal 11. From the animal 11, the catheter 30 passes inside the spring 21, through the 0.9 cm hole 25, into the groove 27, and exits under the cover 16 of the cage 10. The cage cover 16 may be a 28 × 28 cm plate of 4 mm plexiglass with a groove 32 in each edge to receive a screw 24. Two screws 24 are sufficient to anchor both the cross 15 and the cover 16 to the lower portion of the cage 10. For ease of handling, however, four grooves are available, both in the cover 16 and in the cross frame 15. A distance of approximately 1 cm separates the cage cover 16 from the upper edge of the walls 14, providing a space for adequate air exchange. If a tight seal of the cage cover 16 is required, the cross arms 15 may be cut to fit inside the cage 10 instead of resting on the walls 14. Four rims, one on each of the inside walls 14 at the level of the screws 24, would support the cross 15 in such a case, while the catheter 30 leaving the protecting spring 21 through groove 27 would exit through a hole in one of the walls 14.

A water bottle 33 is secured outside the cage 10 by a suitable resilient securing strap 34. The bottle 33 is fitted with a spout 35 reaching the animal 11 through a hole 36 approximately 8 cm above the screen 13. Food may be placed in an open container (not shown) on the screen 13.

Intravascular infusion is advantageously carried out through the aorta. By this route, it is believed that the infusate has a better chance to reach directly more organs, and in a more uniform manner. However, the procedure described herein can be equally well applied to infusion through the jugular vein.

The cross-shaped frame 15 with spring 21 attached is removed from the cage 10. A catheter 30 such as a 120 cm PE-10 catheter (Clay Adams Co., New York) is filled with saline and heparin (1 mg/ml) and sealed at the distal end with hot tweezers. The open end of the catheter 30 is introduced into the spring 21 on the side attached to the ring 28 and pulled through to the other side to a length of about 30 cm. An incision is made through the skin of the nuchal region of the animal 11, as shown in FIG. 6, and a subcutaneous tunnel is fashioned by blunt dissection into the ventral regions of the neck where a counter incision is made.

Through the counter incision, the left external carotid artery is isolated and cannulated, as shown in FIG. 7. The vessel is tied at the cranial end and the lace is not cut. Two laces are loosely placed around the artery caudal to the first one. Blood flow is then interrupted by an assistant who pulls the most caudal lace, without typing it, while the operator pulls the first lace used to close the artery. With the second hand the operator cuts with scissors a small window in the arterial wall and without releasing the tension needed to prevent hemorrhage, introduces the open end of the catheter 30, previously prepared, into the vessel. This operation is facilitated by supporting the artery on a surface, such as the flat end of tweezers, held by the second hand of the assistant.

As the catheter 30 enters the artery, the assistant carefully reduces the tension of the lace while the operator continues to push the catheter 30 caudally into the carotid and thoracic aorta. During this delicate step, care must be taken to prevent hemorrhaging. When the catheter 30 has been inserted to a length of about 1 cm, the assistant ties the most caudal lace, then the operator ties the second lace. The uncut ends of the first lace are used to tie the catheter 30 a third time and to secure it by suturing through the neck muscles.

Two steps are crucial to this procedure: (1) the operator must learn to open a window in the arterial wall large enough to permit passage of the catheter 30 but small enough to prevent total rupture, since the vessel is kept under tension to stop blood flow; and (2) the tension on the first lace must be released so that the catheter 30 can be introduced deeply enough to reach the aorta while avoiding hemorrhage. In the rat 11 this procedure is relatively easy because the outside diameter of the catheter 30 fits well into the lumen of the common carotid artery.

After the catheter 30 has been firmly secured to the neck muscles, the incision is sutured and the animal 11 is turned over to expose the nuchal incision. The spring 37 protecting the catheter is now slipped forward and firmly sutured to the nuchal ligament and skin, as shown in FIG. 8. Wound infection did not occur in our rats if a drop of an antibiotic preparation was used before suturing. The animal 11 is next transferred into the cage 10 attached to the cross-shaped frame 15 bearing the spring 21 and catheter 30 within. The cage cover 16 is then secured and the animal 11 is left to recover from the effects of anesthesia. Ether is routinely employed as the anesthetic.

Infusion can be started as soon as cannulation is completed. However, the animal 11 is preferably allowed to become acclimated to its new environment for the first night. In this case, the catheter 30 which exits at the top of the cage 10 through groove 27 is partially folded-up and left suspended outside the cage 10. Coagulation has not been found to be a problem provided the catheter 30 is filled to the very end with heparinized saline. Infusion is started by connecting the distal part of the catheter 30 to the infusion pump 31 using a 27-gauge needle 38. At least 50 cm of catheter 30 should hang slack outside the cage 10, as shown in FIG. 1. A small weight 39, such as a paper clip, hangs from the catheter 30 to prevent the catheter 30 from falling inside the cage where the animal 11 would promptly chew it. The length of the catheter 30 loop outside the cage 10 is critical. As the animal 11 moves, the spring 21 rotates and the 50 cm loop outside the cage 10 coils and uncoils according to the movements. It takes more than one day before excessive coiling will kink the catheter 30, causing interruption of infusion. Since the infused animal 11 must be checked at least once a day for a variety of reasons, such as addition of infusate, control of pump, etc., the uncoiling of the catheter 30 becomes a daily routine.

The length of the spring 21 is also critical, for it must allow freedom of movement around the cage 10 and yet not be so long that the rat 11 can roll over and pull himself free. For a 175 g rat the spring 21 should preferably reach to within 2 cm above the floor; the distance should be less for smaller animals and vice versa.

The animal 11 may chew the spring 21 and occasionally breakage of the catheter 30 may occur with interruption of infusion. As an additional safety measure, the proximal end of the spring 21 may be replaced by a 10 cm long stainless steel cylinder 40. However, a 1 cm piece of spring 37 must be left for connection to the animal 11.

The type of cage 10 described herein has been and is being used successfully for continuous intra-aortic infusion of radioactive compounds. In some instances, infusion was carried out for periods of two weeks, but could have been continued longer. Disassembling of the cage 10 can be done in as short a time as one minute, by manually loosening the four screws 20 and 24 which remain attached to the cage 10 and are thus never lost. Each component can easily be washed and separately decontaminated because there is no hidden surface which a standard brush cannot reach. The excrement can be removed daily while the animal remains in the same cage. Change of cage can be done without interrupting infusion by transferring the animal 11 with the attached catheter 30, spring 21 and spring-support 15 to a clean cage. Replenishing the water supply is easily done from outside the cage without disturbing the animal.

A key feature of the cage of the present invention is the continuity of the catheter from the infusion pump 31 to the vascular system of the animal. Aortic infusion imposes a back pressure of about 100 mm Hg, which has been found to produce leakage in all known swivel systems. Even when the infusion was done through the jugular vein, swivel joints were too often troublesome and loss of infusate occurred rather frequently. Such problems are effectively avoided by the present invention. A square-shaped cage was designed in accordance with the present invention, as it has been found that rodents tend to find a corner as a sleeping area. Round cages, on the other hand, were found to favor restlessness and excessive coiling of the catheter.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the forms hereinbefore described being merely preferred embodiments thereof.

It is claimed:

1. An animal cage for use in continuous infusion of animals in a laboratory environment, comprising: a square-shaped base; four vertical side walls removably mounted upon said base; preferably a cross-shaped frame mounted on the upper portion of the side walls, one arm of the frame engaging each of the side walls, a vertical hole located at the confluence of the cross arms of the frame, the hole having an interior rim; a horizontal groove in the upper surface of the cross-shaped frame which connects said hole with the intersection of two of the cross arms; a ring and tubing arrangement which extends through said hole with the ring resting on the interior rim in said hole, the tubing extending below the ring and being attached to a spring; a catheter extending from the exterior of the cage through the groove in the cross-shaped frame, then through said ring and tubing arrangement and said spring, said catheter having means at one end outside the cage for connection to a source of infusate and means at the other end for connection to the animal occupying the cage; and a cover for the cage, said cover being releasably attached to the upper edge of the side walls.

2. The animal cage of claim 1, further including a small weight attached to the portion of the catheter which is outside the cage.

3. The animal cage of claim 1, wherein a space is provided between the cage cover and the upper edge of the side walls.

4. The animal cage of claim 1, wherein the base includes a grooved rim extending around the inner circumference of the base, said grooved rim receiving on its lower edge a drawer mounted within the base; and wherein a wire mesh screen rests upon the upper edge of said grooved rim.

5. The animal cage of claim 1, wherein a water bottle is secured to the exterior of one side wall, with means for providing water from the bottle to the animal within the cage.

6. The animal cage of claim 1, wherein the base, the side walls, the cross-shaped frame and the cover are constructed preferably of fiberglass.

7. The animal cage of claim 1, wherein the means for connecting the catheter to the animal includes means for providing infusion through the aorta of the animal.

* * * * *